United States Patent [19]

Burns

[11] Patent Number: 5,058,915
[45] Date of Patent: Oct. 22, 1991

[54] TRAILER HITCH

[76] Inventor: Darrel J. Burns, 8885 N. Redden Rd., Park City, Utah 84060

[21] Appl. No.: 580,173

[22] Filed: Sep. 7, 1990

[51] Int. Cl.[5] ............................................. B60D 1/01
[52] U.S. Cl. ................................ 280/441.2; 280/504; 280/901; 403/254; 403/316; 403/353
[58] Field of Search ................... 280/417.1, 441.2, 495, 280/496, 498, 504, 507, 901; 403/254, 316, 353

[56] References Cited

U.S. PATENT DOCUMENTS

| | | | |
|---|---|---|---|
| 2,759,737 | 8/1956 | Manning | 280/441.2 |
| 2,925,286 | 2/1960 | Hodges et al. | 280/901 |
| 3,220,750 | 11/1965 | Mead | 280/901 |
| 3,730,557 | 5/1973 | Cox | 280/504 |
| 3,843,161 | 10/1974 | Hastings | 280/901 |
| 3,893,713 | 7/1975 | Ivy | 280/901 |
| 4,183,548 | 1/1980 | Schneckloth | 280/901 |
| 4,428,596 | 1/1984 | Bell et al. | 403/353 |

Primary Examiner—Charles A. Marmor
Assistant Examiner—Mitchell Bompey
Attorney, Agent, or Firm—M. Reid Russell

[57] ABSTRACT

A trailer hitch including a pin that extends axially from a pivotal mounting by a universal joint of a rocking or tilting platform of a trailer draw or towbar. The pin is preferably cylindrical and is grooved circumferentially for fitting into a wide head end of a keyhole or keyway slot formed in a mounting plate attached to a truck bed. The keyway forward circular end includes a flange therearound that fits into the cylindrical pin groove, prohibiting the pin from lifting from the keyway. To complete the locking of the pin to mounting plate, either the pin includes a plug for extending axially into a hole formed in the mounting plate in the center of the keyway forward end, or a brace plate is installed in a keyway large rearward end, resting against the pin prohibiting the pin for being slid therefrom. Which plug is extended or withdrawn by turning a locking or camming rod journaled across the pin, which locking or camming rod is spring biased to a plug extended attitude.

17 Claims, 5 Drawing Sheets

TRAILER HITCH

BACKGROUND OF THE INVENTION

1. Field of the Invention

This invention relates to hitches and in particular to couplings for mounting a trailer draw or towbar end onto a pickup truck bed.

2. Prior Art

It has long been known and in practice to provide a fifth wheel-type hitch for attaching a trailer draw or towbar end to a pickup truck bed. Examples of such type hitches are shown in Patents to Leland, U.S. Pat. No. 3,820,821; to Hodges Jr., et al, U.S. Pat. No. 2,925,286, both of which show heavy plates attached to a pickup bed that are essentially fifth wheel configurations.

Further, functionally like the above set out fifth wheel configurations, couplers that are mounted on and within a truck bed involving cups or cylinders wherein a standard ball is mounted for engaging and coupling to a plate that is secured across the end of a trailer towbar are shown in Patents to Ivy, U.S. Pat. No. 3,893,718; and to Stephenson, U.S. Pat. No. 3,574,363. None of the above arrangements, however, are like the present invention in a trailer hitch that does not include a ball type coupling or a recessed truck bed mount.

Other ball type couplings for use in connecting a trailer draw or towbar to a pickup truck are shown in patents to Schneckloth, U.S. Pat. No. 4,183,548 and to Taylor, U.S. Pat. No. 4,546,994. A mounting for a gooseneck type of draw or towbar that is supported to a pickup truck bed, is shown in Patents to Kann, U.S. Pat. No. 3,889,978. The Kann patent shows a telescoping sleeve arrangement whereby the trailer gooseneck end is telescoped over a vertical pin that extends upwardly from a pickup truck bed. A patent to Johannes, U.S. Pat. No. 3,790,188, where it also shows a gooseneck type trailer draw or towbar, involves a ball type end for coupling into a ball receiving hitch that is maintained to a pickup truck bed. A patent to Feterl, U.S. Pat. No. 3,972,541, like the above cited Johannes and Kann patents, also shows a gooseneck type trailer draw or towbar coupling, but involves a hook type coupling arrangement on the draw or towbar end that fits around a lateral rod that is part of the truck bed mount, the hook arranged to fit and lock over the rod.

Unlike the above set out Kann, Johannes, and Feterl patents, the present invention does not involve either a ball or hook type hitch. Rather it employs a latching plug for locking a pin of the trailer draw or towbar to a plate that is mounted to a pickup truck bed.

SUMMARY OF THE INVENTION

It is a principal object of the present invention in a trailer hitch to provide a pin as a draw or towbar end for coupling to a plate that is mounted to a pickup truck bed.

Another object of the present invention is to provide a trailer hitch for coupling a trailer draw or towbar to a pickup truck bed where the plate portion of the hitch that is secured to the pickup truck bed portion takes up only a small amount of bed spaced.

Another object of the present invention is to provide, as a male coupling portion of the trailer hitch, a pin that extends axially therefrom and has a circumferential groove for traveling into a flange edge of a circular end portion of a keyhole or keyway of a mounting plate that is secured to a pickup truck bed prohibiting the pin from lifting out of the keyhole or keyway, which pin includes a movable plug for travel into a hole formed in the center of the mounting plate circular end portion, or, in lieu of the movable plug, a separate wedge plate can be fitted into the keyhole or keyway blocking travel of the pin, each arrangement for prohibiting the pin from sliding out of the mounting plate keyhole or keyway.

Still another object of the present invention is to provide a trailer hitch where a trailer draw or towbar end is mounted through a pivot coupling to a mounting plate.

Still another object of the present invention is to provide a spring biasing arrangement in one embodiment where, the plug is spring biased into the mounting plate hole or recess, and in another embodiment the plug is operated by a camming rod that, when turned positively moves the plug.

Still another object of the present invention is to provide a trailer hitch that is easy to install, reliable in its use, takes up a minimum space and has few moving part.

The trailer hitch of the present invention includes, as the trailer draw or towbar end, a pin that is connected axially thereto through a pivot arrangement. The pin is cylindrical and has a continuous groove therearound. The pin either includes a plug arranged to extend axially from a bottom end face thereof to fit into a hole in a small diameter base end of a keyhole or keyway formed in a mounting plate that is secured onto a truck bed, or a large diameter end of which keyhole or keyway receives a brace plate whereagainst the pin bolts the plug or brace plate prohibiting the pin from sliding in that keyhole or keyway.

The mounting plate consists of a flat metal plate that has the keyhole or keyway recess formed therein and is for attachment onto the truck bed. The keyhole or keyway has a greater diameter at a base end that receives the pin than at a circular upper or forward end portion, which circular upper end portion includes an inward flange around its circumference to slide into a circumferential groove formed around the pin prohibiting the pin from lifting out of the keyhole or keyway. The mounting plate either includes a hole or depression formed in the plate at the center of that circular upper or forward end portion for receiving the plug extended from the pin end or a separate brace plate and is arranged to fit into the keyhole or keyway greater diameter base end, the plug or brace plate prohibiting pin travel.

The pin is cylindrical and, as set out above, is for fitting into the keyhole or keyway base end, to slide therein into the upper or forward end portion to where the continuous groove formed around that pin engages and receives therein the flange of the keyhole circular upper or forward end portion, the plate flange seating around more than one hundred eighty (180) degrees of its circumference in the pin groove. Thereat, the pin is precluded from lifting out of the keyhole or keyway by the extension of the plug axially from the pin end into the mounting plate hole or depression by turning a camming rod that extends across the pin, or the fitting of the bracing plate into the keyhole or keyway base end. Both the extended plug or brace plate prohibit the pin from sliding from the keyhole or keyway upper or forward end back to the base end. The plug, in one embodiment, is spring biased into an extended attitude from the pin, which biasing is overcome by the weight of the trailer compressing the spring and allowing the plug to retract into the pin.

In another embodiment, the plug is positively moved upwardly and downwardly by turning a camming rod that includes an eccentric lobe that travels over a lateral hole in the plug. In both embodiments the locking and camming rods are spring biased by a flat spiral spring to the attitude where the plug is extended axially from the pin end. To facilitate camming rod and locking rod positioning, a stepped pin stop arrangement is provided with the end thereof engaging the camming rod or locking rod surface for fitting into holes or depressions therein for sensing camming rod or locking rod positions whereat the plug is in an extended or retracted attitude.

As set out above, the pin mount to the trailer draw or towbar is a pivot coupling. In one embodiment, this pivot coupling is through a universal joint, and in another it is through a platform that is pivotally mounted to opposite sides of the pin to only tilt forward and rearward across the pin top face.

THE DRAWINGS

In the drawings it will be illustrated that which is presently regarded as the best mode for carrying out the invention.

DETAILED DESCRIPTION OF THE INVENTION

Figure 1:
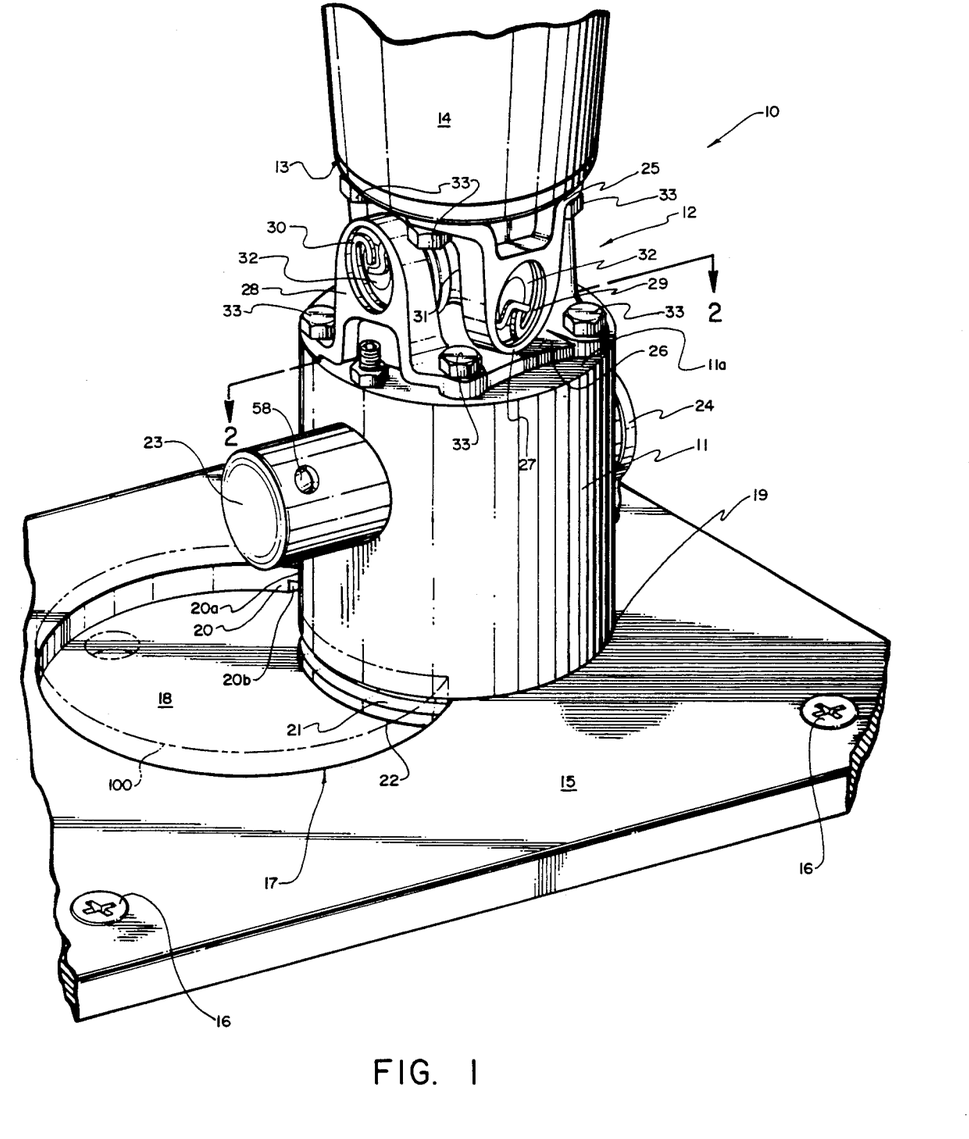
FIG. 1, shows a profile perspective view of the present invention in a trailer hitch showing a pickup truck bed mounting plate with keyhole recess formed therein and showing a pin end mounted through a universal joint to a trailer draw or towbar end, the pin shown secured in an upper or forward end of the keyhole recess.
Figure 11:
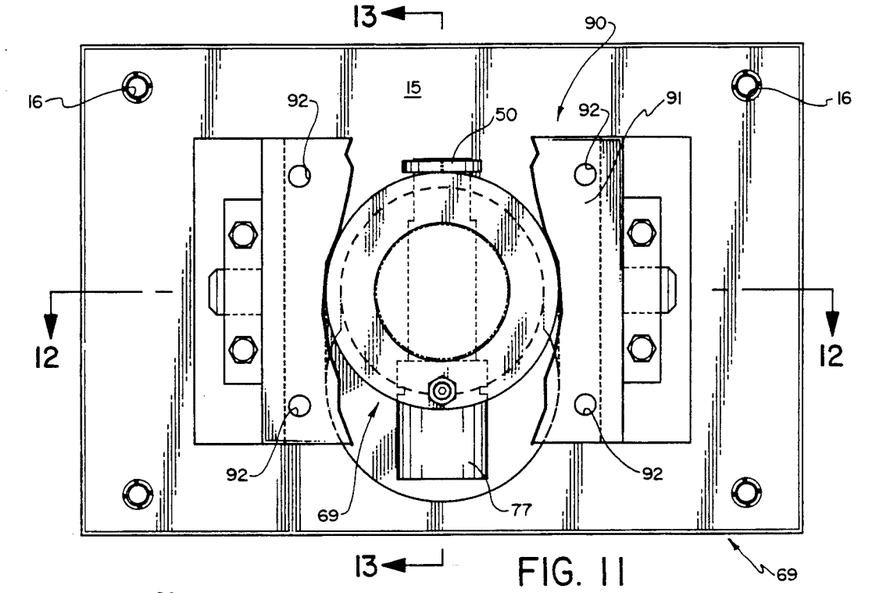
FIG. 11, is a top plan view of the trailer hitch of FIG. 10, with a center segment of a tilt plate thereof shown removed.
Figure 12:
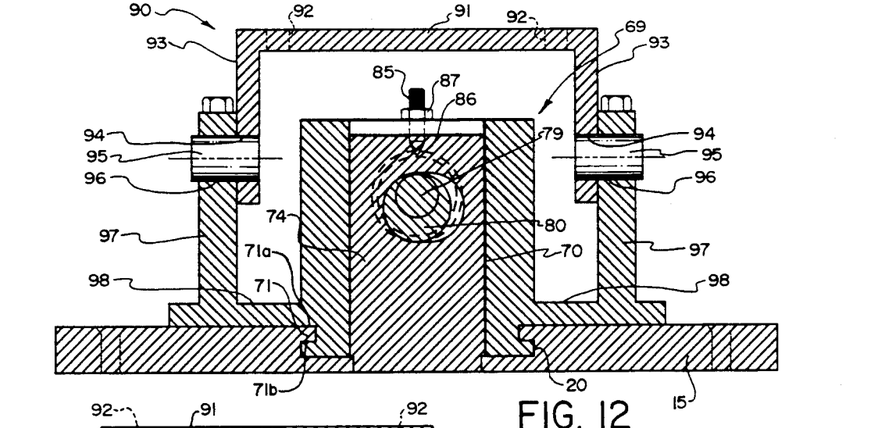
FIG. 12, is a rear elevation sectional view taken along the line 12—12 of FIG. 11.
Figure 13:
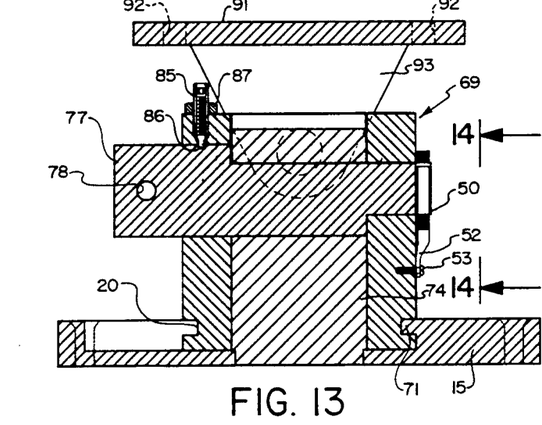
FIG. 13, is a side elevation sectional view taken along the line 13—13 of FIG. 11.

Referring now to the drawings:

FIG. 1 shows a first embodiment of trailer hitch 10 of the present invention that includes a cylindrical pin 11 connected through a universal joint 12 to a plate 13 of a draw or towbar 14. FIGS. 11 through 13 show another arrangement of a draw or towbar of a trailer 61 that utilizes a trailer hitch 69 that provides a single axis movement.

Figure 10:
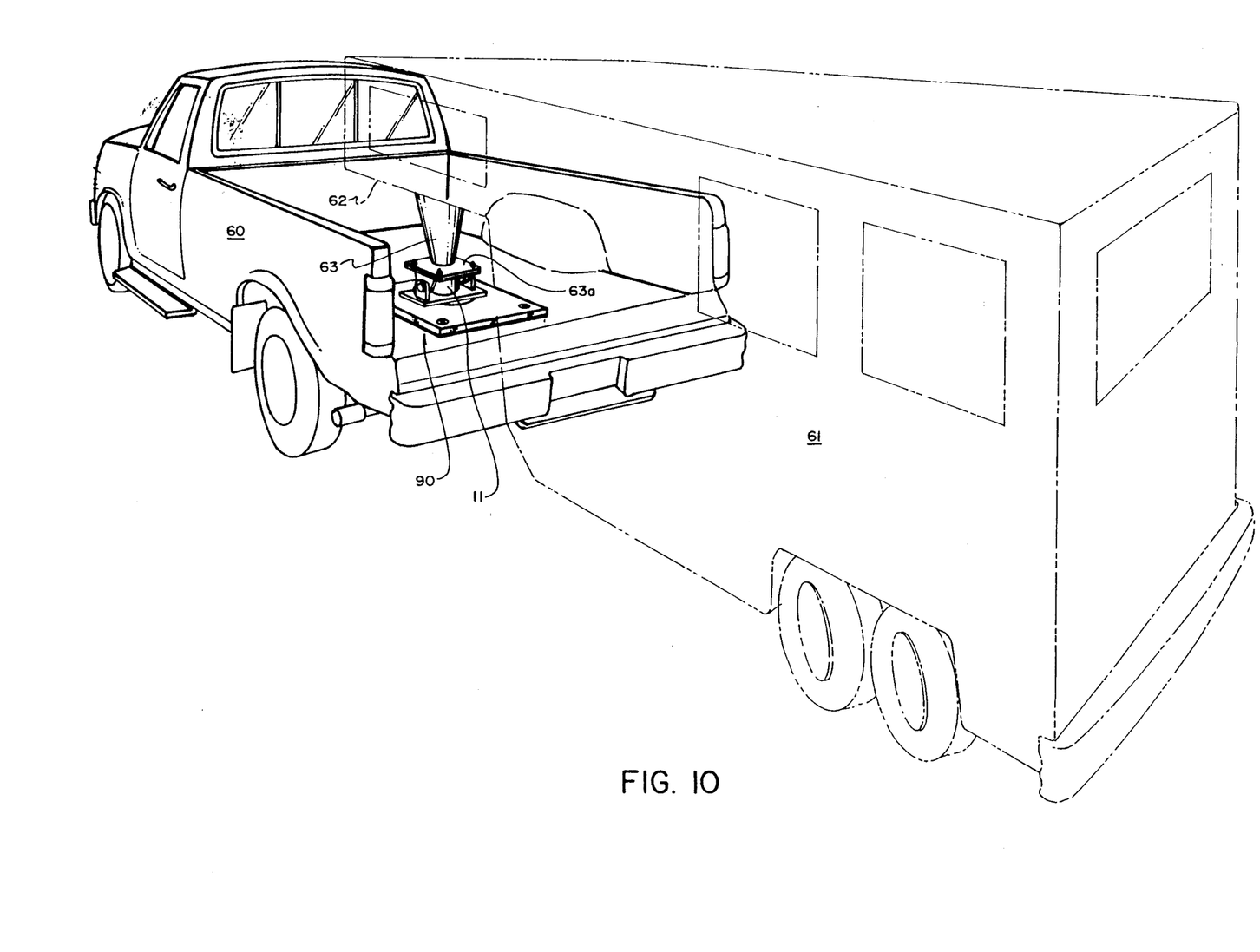
FIG. 10, is a perspective view of a pickup truck with an embodiment of the trailer hitch of the present invention shown attached to a trailer draw or towbar end, which embodiment includes a tilt plate that is arranged between that draw or towbar end and the pin of the trailer hitch that is the pin shown in FIGS. 5 through 8.

Shown in FIGS. 1 through 5, pin 11 is for mounting to a mounting plate 15 that is attached by screws, bolts or other appropriate fasteners 16 onto the bed of a truck, such as a pickup truck like the pickup truck 60 shown in FIG. 10. The mounting plate 15 has a keyhole or keyway opening 17 formed therein consisting of a large diameter base that is shown as a circular hole or depression 18, but may be any appropriate shape, and an intersecting smaller diameter forward hole or depression that is also shown as another circular but may be another shape to accommodate the pin 11. Which keyhole or keyway 17 may be longitudinal to the truck bed or arranged thereacross and should be understood to be forward with respect to a truck cab. To connect the trailer to the mounting plate 15, the pin 11 that has a smaller diameter than the size of the base hole or depression 18, is aligned and fitted therein. Whereafter the truck or trailer is moved to slide the pin 11 relative to the plate 15 into the lesser diameter forward portion of the hole or depression 19. In that movement, a circumferential flange 20 that projects inwardly from around the edge of the forward hole or depression 19 will fit into and slide within circumferential groove 21 that is formed around the pin 11, proximate to a bottom or base end 22 thereof. A metal to metal contact is thereby made between the flange upper and lower faces 20a and 20b, respectively, within the walls of circumferential groove 21. This connection directly distributes loads as may be exerted through the pin 11 around the flange and prohibiting the pin from lifting vertically out of the keyhole or keyway 17.

Figures 8, 9:
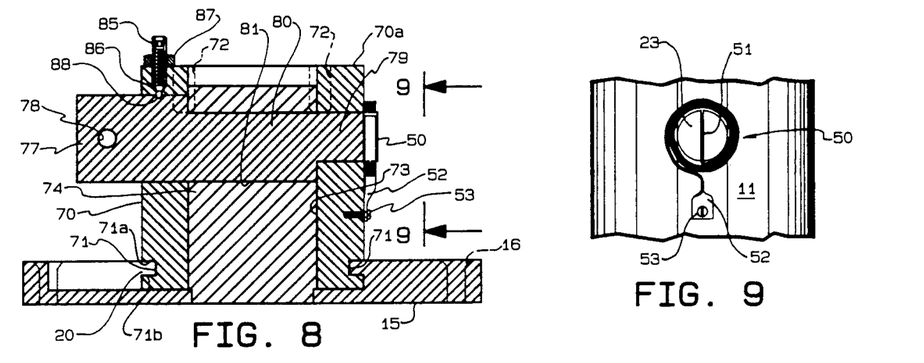
FIG. 8, is a side elevation sectional view like that of FIG. 4, shown taken along the line 8—8 of FIG. 5.
FIG. 9, shows a view of the locking and camming pins of FIGS. 1 through 8 with one end of a flat spiral spring shown attached on one end to the pin surface and with the other flat spiral spring end mounted to an end of the camming rod and/or locking rod.

As shown in FIG. 1, and as will be discussed in detail hereinbelow with respect to a discussion of FIGS. 2 through 9, the cylindrical pin 11 includes a locking rod 23 and the camming rod 77, as shown best in FIGS. 6 through 9, that is journaled and extends laterally through the pin 11. The locking rod, as shown best in FIGS. 3 and 4, have an end 51 as best shown in FIG. 9, of a flat spiral spring 50 mounted through a slot at the end thereof. The other end of which flat spiral spring is flattened at 52 and is secured by screw 53 to the pin 11 surface, the functional interaction of which flat spiral spring and locking rod is set out hereinbelow.

FIG. 1 shows the universal joint 12 as consisting of upper and lower plates 25 and 26 each having aligned parallel arms 27 and 28, respectively, extending therefrom at essentially ninety (90°) degree angle from opposite sides thereof, that include aligned bearing holes 29 and 30, respectively. Rod ends 32 of a cross 31 are shown journaled in the respective bearing holes 29 and 30, forming the universal joint 12. The upper and lower plates 25 and 26, of which universal joint are secured, respectively, by bolts or like fasteners 33, to the weld plate 13 and to the top 11a of pin 11. So arranged, the weld plate and draw or towbar 13 is free to pivot forward and rearwardly and from side-to-side relative to the pin 11 and visa versa.

Figure 2:
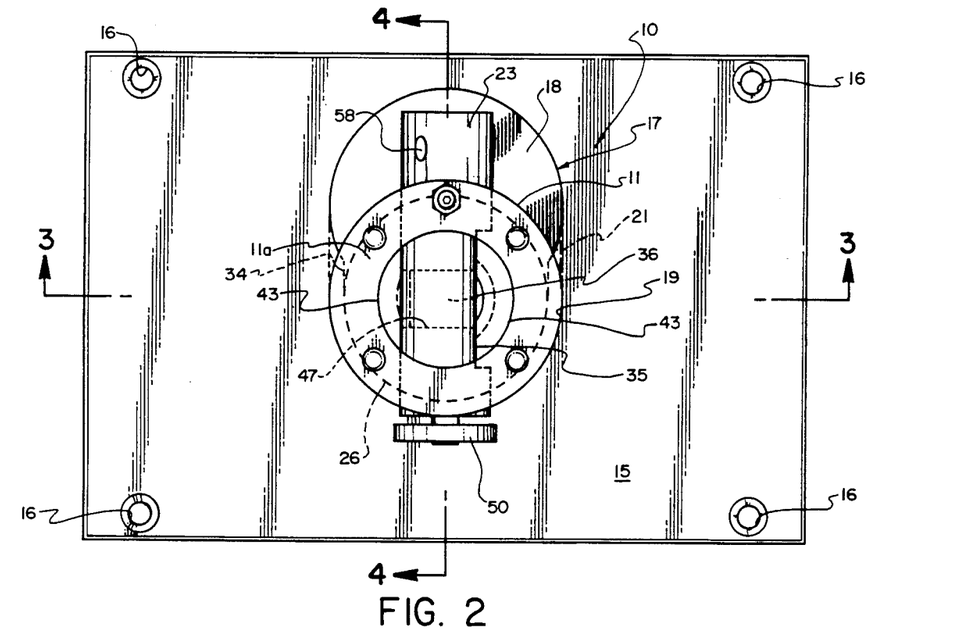
FIG. 2, shows a top plan view of the trailer hitch of FIG. 1, with the universal joint removed therefrom.
Figure 4:
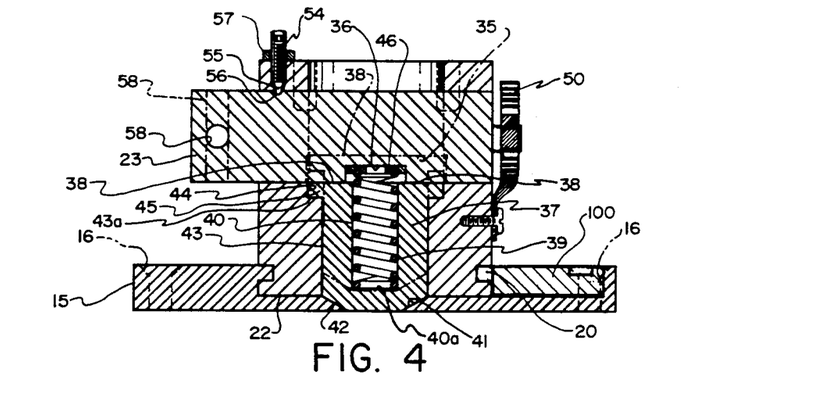
FIG. 4, a side elevation sectional view taken along the line 4—4 of FIG. 2, with the locking rod, shown in broken lines, aligning with the plug top allowing it to retract, into the pin under the urgings of the weight of trailer compressing the biasing spring.

FIG. 2, is a top plan view showing the pin 11 and mounting plate 15 of FIG. 1, with the universal joint 12 removed. The mounting groove 21 is shown formed around the pin 11 in broken lines, and broken lines 34 show the intersection of the base hole of depression 18 and forward hole or depression 19 of keyhole or keyway 17. The locking rod 23, is shown as being flattened at 35 and 36 respectively, adjacent to each other at ninety (90) degrees, which flatten portions travel over a spring plate 36 that sits on spring 39. With locking rod positioned, as shown in FIG. 4, spring plate 46 rests on surface 36. Locking rod 23 prevents or restricts plug 37 from traveling upwardly or outwardly by making a metal to metal contact of locking pin 23 and plug 37 at surfaces 38 on either side of spring plate 46, providing a positive locking of plug 37 and mounting plate 15 at a centered surface of hole 41. By rotating locking rod 23 through ninety (90) degrees causes spring plate 46 to come into contact with surface 35, thereby extending locking plug 37 and allowing plug surface 38 to travel upwardly until it contacts surface 35, as shown in broken lines in FIG. 4. This allows plug 37 end to move out of hole 41 in plate 15, thereby allowing pin 11 to be slide or moved from the keyhole or keyway forward hole 19, allowing the pin 11 to be lifted or separated from plate 15. Spring plate 46 rests on top end of spring 39 that is contained in a longitudinal cavity 40. Compression of spring 39 between spring plate 46 and cavity surface 40a exerts downward pressure for keeping plug 37 engaged in hole 41, thereby providing a positive locking of pin 11 to the mounting plate 15. Which plug 37 is fitted into mounting plate hole 41 to provide a positive locking of pin 11 to the mounting plate 15 keeping the pin from sliding from the forward to base holes and disengaging the flange 20 of the pin groove 21. Alternatively, a brace plate 100, shown in broken lines in FIG. 1 may be installed in the base hole or depression 18 for also restraining pin 11 from sliding from the forward hole 19. Which brace plate 100 also serves as a cover keeping foreign materials out of the base hole 18.

Figure 3:
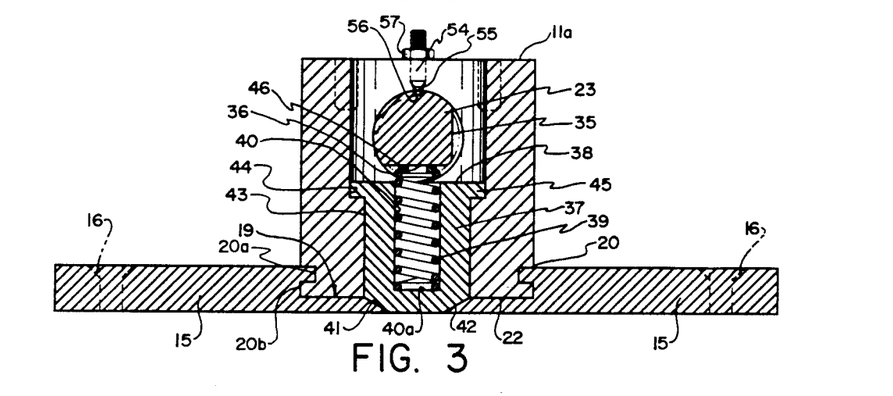
FIG. 3, shows a frontal elevation sectional view taken along the line 3—3 of FIG. 2.

As set out above, the plug 37 is arranged to travel vertically within a center longitudinal passage 43 of pin 11, which passage is stepped outwardly at 44, as shown in FIGS. 3 and 4, to accommodate an outwardly stepped head end 45 of the plug 37. Plug 37 travel, as shown best in FIG. 3, is limited by contact of the plug head end 45 undersurface with the horizontal side 43a of the stepped portion 43a of the pin 11 center longitudinal passage 43. In the attitude shown in FIG. 3, coil spring 39 is compressed between a plate 46 on one end and the bottom end 40a of the plug longitudinal cavity 40. Which plate 46 is maintained stationary across surfaces 35 and/or 36, respectively, as locking rod 23 is rotated ninety (90) degrees.

The plug 37, tapered end 42, as set out above, is biased into its seat in hole 41 of the mounting plate 15, this biasing is overcome by contact of the pin 11 end to the mounting plate 15, the plug 37 extends into hole 41 when aligned therewith. It is desirable to restrain locking rod 23 movement due to vibration. FIG. 3 shows such locking rod 23 biasing utilizing a flat spiral spring 50 that, as shown best in FIG. 9, is connected on its one end 51 across the end of the locking rod 23 and is mounted at an opposite flattened end 52 to the side of pin 11 by a screw 53, or like fastener.

Further, for maintaining the locking rod 23 from moving out of pin 11, as shown respectively in FIGS. 3 and 4, a threaded stepped set screw 54 is turned into a tapped hole by the top end 11a of pin 11 such that its stepped set screw end 55 will engage an appropriate slot or depression 56 that is formed in the locking rod 23 surface. So arranged, when that locking rod is either in the plug extended or plug retracted attitude of FIGS. 3 and 4, the stepped set screw end 55 is installed in a locking rod slot or depression 56. Which slot is to keep locking rod 23 from moving back and forth. Adjustment of the stepped set screw 54 height is provided by appropriately turning the stepped set screw 54 to a proper setting and then turning a lock nut 57 into tight fitting engagement to the surface 11a of pin 11.

As shown best in FIGS. 1, 2 and 4, a hole 58 is provided through the locking rod to receive a tool, such as a rod, fitted therein for turning the locking rod. Additionally, within the scope of this disclosure, another turning arrangement such as a handle or the like can be fixed to the locking rod 23.

In FIG. 10 a pickup truck 60 is shown with the mounting plate 15 secured to its bed and with a forward or nose end of a trailer 61 positioned thereover. A nose end 62 of which trailer 61 includes a draw or towbar 63 that extends vertically and whereto the pin of the embodiments of the trailer hitch of the present invention is mounted, as set out hereinbelow. In practice, the trailer nose end 62 is lowered appropriately to lower pin 11 or pin 70 or other arrangement of the trailer hitch exactly into the base hole or depression 18 of the keyhole or keyway 17. The plug 37 moved upwardly in passage 43 by the weight of trailer against surface 18 compressing spring 39. Thereafter, the truck is moved forward or back respectively, the pin travels in the keyhole or keyway 17 to where the pin groove 21 fully receives the flange 20 sliding therein, seating the pin in the small circular end 19 of keyhole or keyway 17 as shown in FIG. 1, with the plug 37 biased into depression 42 by compression spring 39. The operator then turns the locking rod 23 from the attitude shown in broken lines in FIG. 4 to the attitude shown in solid lines in FIG. 4 and in FIG. 3, whereat plug surface 38 forms a metal to metal contact preventing plug 37 from biasing out of depression 42. So arranged, the pin 11 is prohibited from lifting by the engagement of the flange 20 in the pin circular groove 21, and the plug 37 is prevented from sliding out of the forward circular end 19 of the keyhole or keyway 17. Which sliding may be further or alternatively prevented by installation of the brace plate 100 in the keyhole or keyway base hole 18, as shown in FIG. 1.

Figures 5, 6, 7:
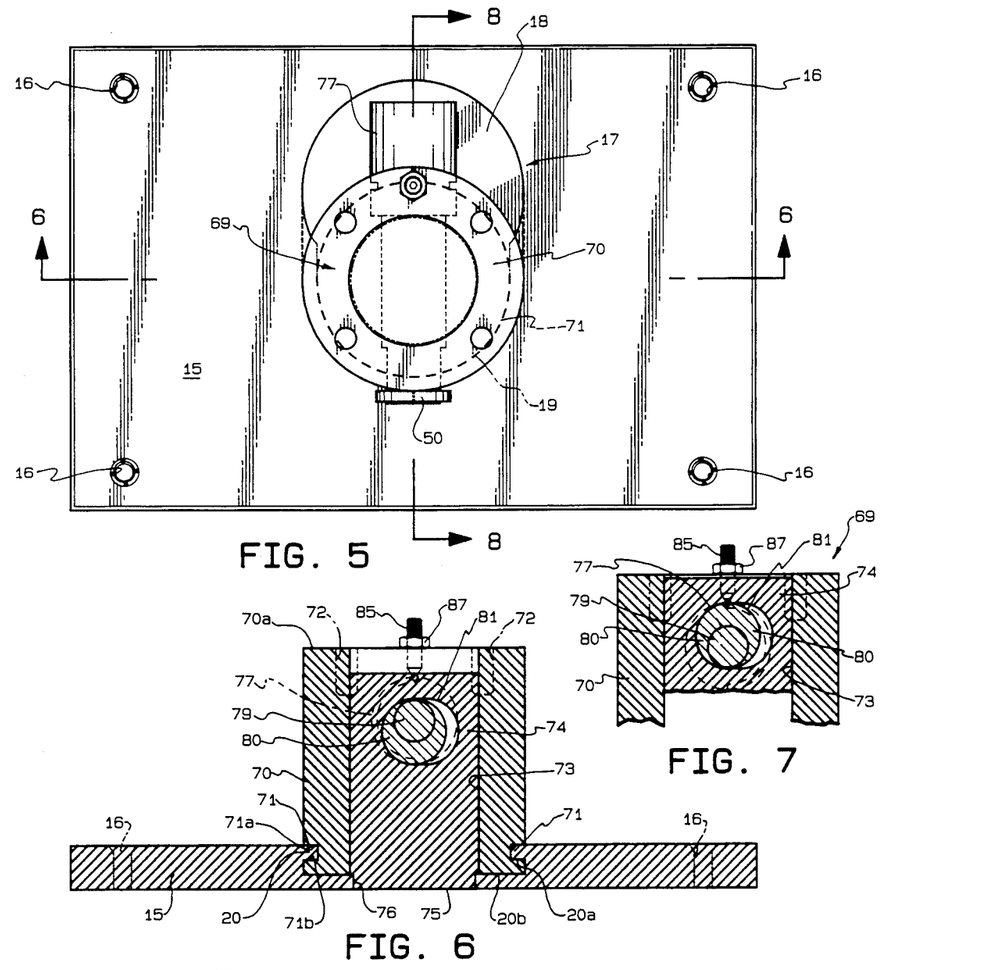
FIG. 5, is a view like that of FIG. 2, showing another embodiment of the pin portion of the trailer hitch.
FIG. 6, is a frontal elevation sectional view, like that of FIG. 3, shown taken along the line 6—6 of FIG. 5.
FIG. 7, is an enlarged view like FIG. 6 showing the camming rod rotated one hundred eighty (180) degrees, to elevate the plug to within the pin.

In FIG. 5, is shown a top plan view of a trailer hitch 69 that is essentially like the view of FIG. 2, and shows the same mounting plate 15 with keyhole or keyway 17 formed therein that consists of a wide diameter or other shape base hole or depression 18 and a smaller diameter forward hole or depression 19 for locking to a pin that is shown in this embodiment as pin 70. Pin 70 is like pin 11, in that it also includes a circumferential groove 71 for receiving flange 20 of the mounting plate 15, the upper and lower surfaces, respectively, 20a and 20b of which flange 20 to closely fit within groove 71, against groove walls 71a and 71b. Like pin 11, pin 70 also includes holes or recesses 72 formed in the top 70a thereof for receiving fasteners, like those shown in FIG. 1, for attaching a pivot coupling to the top thereof. Another or second embodiment of a pivot coupling is shown in FIGS. 10 through 13 that utilizes the pin 70.

Like pin 11, pin 70 also includes a center longitudinal opening 73 that is not, however, stepped for receiving a plug 74 that is fitted longitudinally therein so as to move vertically. The plug 74 bottom end 75 like plug 11 end 41 is to fit into a hole or recess 76 in plate 15, which hole or recess 76 is, however, not tapered, as is the hole or recess 42 shown in FIGS. 3 and 4.

The plug 74 of FIGS. 5 through 8 is moved longitudinally by a camming rod 77, that as shown best in FIGS. 5 and 8 extends laterally through the pin 70. Camming rod 77, like locking rod 23, incorporates the described flat spiral spring 50 secured across its end 79, as shown in FIG. 14, and includes a lateral port or opening 78 formed through its opposite end for receiving a tool, not shown, for turning.

In FIGS. 6 and 7, the straight camming rod 77 is shown stepped with a small diameter end 79, that is journaled through the side of pin 70, then stepped to an eccentric lobe 80, with the camming rod then stepped outwardly therefrom into a rod end that is journaled through the opposite pin 70 side, both the small diameter and rod end of camming rod 77 have the same center longitudinal axis, and the lobe 80 is eccentric to that axis.

Figure 14:
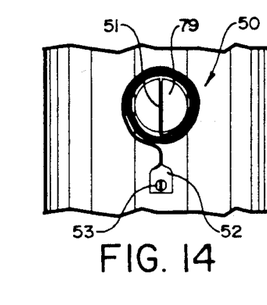
FIG. 14, is a view like the view of FIG. 9 of a section of the pin and camming and locking rod end wherebetween the flat spiral spring is attached.

As set out above, the camming rod 77, as illustrated in FIG. 14, is biased by the flat spiral spring 50 to where the pin 74 is in an extended attitude. This biasing is provided by securing the one flat spring end 51 across the camming rod end 79 with the other flat spring end 52 flattened and receives screw 53 turned therethrough and into the side of pin 70. Moving plug 74 laterally is provided by turning the camming rod lobe 80, that is shown best in FIGS. 6 and 7, continuously engages the wall of a lateral opening or hole 81 that is formed through plug 74. The lobe surface 80 thereby functions as an eccentric. When the lobe is pointed downward, in a six o'clock attitude as shown in FIG. 6, the plug will be in an axially extended attitude from the plug end. The plug thereby traveling with lobe surface 80 acting on the wall of opening or hole 81 as the camming rod is rotated. Accordingly, when the camming rod is in the attitude shown in FIG. 7, the eccentric lobe points upwardly at a twelve o'clock attitude and has lifted the plug end 75 out of the opening or hole 76 in mounting plate 15.

In the trailer hitch 69 embodiment of FIGS. 5 through 8, the relationship between the camming rod 77, with eccentric lobe 80 that is in constant engagement with the wall of the plug 74 lateral passage 81 provides for lifting and lowering of the plug into seated and unseated engagement in the mounting plate 15 without a need for spring biasing. Accordingly, the only spring biasing involved with trailer hitch 69 is that provided by the flat spiral spring 50 that, as shown in FIG. 14, biases the camming rod 79 to where the plug is in an extended attitude to maintain the pin 70 in mounting plate 15.

A threaded stepped pin 85 is provided for sensing the camming rod positioning. Which stepped pin 85 is like the stepped pin 54 described with respect to FIGS. 1 through 4, in that it also includes a stepped end 86 and as shown best in FIG. 8, has a height locking capability by turning a nut 87 against the top surface of pin 70, thereby locking the stepped pin in place. The stepped pin end 86 is for engaging and fitting within a slot or depression formed in the camming rod 79, for seating therein. This seating prevents camming rod 77 from moving out of pin 70, as described with respect to FIGS. 1 through 4. Operation of the pin 70 and plug 74 combination shown in FIGS. 5 through 8, is essentially like that described with respect to functioning of the pin 11.

FIG. 10, shows a pickup truck 60 and trailer 61, which trailer includes draw or towbar 63 the end on which can be mounted the pin 11 or 70 of either of the described trailer hitches 10 or 69 through a pivot mount. FIG. 1 shows a universal coupling where the pickup truck 60 trailer 61 can move relative to one another in both pitch and roll axis to the top of the pin 11. FIG. 10 shows a tilt mount 90, as another coupling for use with either pin 11 or 69.

The tilt mount 90, as shown best in FIGS. 11 and 12 includes the pin arrangement 69 of FIGS. 5 through 8. However, as set out above, tilt mount 90 could be also utilized with pin 11. The pin configuration of the embodiment of FIGS. 11 through 13 has been numbered identically to the pin 70 and mounting plate 15 of FIGS. 5 through 8 and it should be understood the description of the pin arrangement trailer hitch 69 and functioning of FIGS. 5 through 8 should be taken as being the same for FIGS. 11 through 13.

FIGS. 11 through 13, show tilt mount 90 as consisting of a top plate 91 with holes 92 formed through its corners for receiving bolts or like fasteners to fasten top plate 91 to a transverse plate 63a. Transverse plate 63a, as shown best in FIG. 10, is welded or otherwise attached across the end of the draw or towbar 63.

Top plate 91 shown in FIGS. 11 through 13, includes right angle sides that are parallel and face one another across the plate opposite sides forming an inverted channel. The channel sides 93 each include rod 95 welded into sides 93 so as to be permanent and not move or turn. The opposite end of each rod 95 is maintained through an opening 96 that is formed in each of a pair of upright parallel brackets 97, which upright parallel brackets 97 are connected to opposite sides of the pin 70 on plate 98. Pin 70 therefor is rigidly secured to plate 98. Plate 98 has two upright brackets 97 attached thereto that receive rod 95, pivotally coupling plate 98 to plate 91 to tilt forward and rearwardly. So arranged, the trailer hitch 90 limits movement of the trailer 61 relative to the pickup truck 60 bed tilting forward and rearwardly, while prohibiting rotation across the pickup truck bed as could bring the sides of trailer nose 62 into engagement with the top edge of the truck bed.

Where the keyhole or keyway 17 has been shown as formed from intersecting circular holes or cavities of different diameters, it should be understood that any convenient configuration, such as a triangular, square, rectangular, or combination, can be adopted so long as a forward coupling end thereof includes a flange that extends therefrom to engage a groove formed in a pin, that may also be a shape other than cylindrical. Which pin groove and flange couple to prevent lifting movement of the pin off from the flange. It should, however, be understood that the present disclosure is made by way of example only and that variations thereto are possible within the scope of this disclosure without departing from the subject matter coming within the scope of the following claims and reasonable equivalency thereof, which claims I regard as my invention.

I claim:

1. A trailer hitch comprising, a pin means that is coupled axially through a pivot means to an end of a trailer towbar; a mounting plate means for attachment to a truck bed that includes a keyway formed therein for receiving the end of said pin means to slide therein from a wide portion to a forward keyway end that is configured to receive said pin means; means for locking said pin means in said forward keyway end so as to prohibit it from lifting therefrom; means for prohibiting said pin means from sliding from said forward keyway end consisting of a hole or depression that is formed in said mounting plate means at the center of said forward keyway end and a plug means which is arranged to slide vertically within a center longitudinal cavity formed in said pin means; and means for extending said plug means axially from the center of said pin means end into said mounting plate hole or depression.

2. A trailer hitch as recited in claim 1, wherein the pin means is a cylindrical pin having a flat bottom surface for sliding along a flat bottom face of the keyway; and the forward keyway end is circular to accommodate a portion of the pin means cylindrical surface and opens to the keyway wide portion.

3. A trailer hitch as recited in claim 1, wherein the means for prohibiting said pin means from sliding is a brace plate means for installation in said keyway wide portion after said pin means is filled into said keyway forward end.

4. A trailer hitch as recited in claim 1, wherein the pin means is a cylindrical pin; and as the means for locking said cylindrical pin in the forward keyway end a circular groove is formed into the cylindrical pin to align with and receive an inwardly planar flange formed around the edge of the forward keyway end.

5. A trailer hitch as recited in claim 1, wherein the means for extending said plug means is a locking rod that is journaled across the cylindrical pin and includes a central section that is in alignment with a head end of said plug means and acts on said plug means head to prevent it from retracting.

6. A trailer hitch as recited in claim 5, wherein the locking rod central section includes a notched out portion that, when the locking rod is turned to where said notched out portion aligns with the head end of which plug means said plug means can move into said locking rod notched out portion, against a biasing force that urges said cylindrical pin into an extended attitude.

7. A trailer hitch as recited in claim 6, wherein the means for biasing the plug means is a coil spring fitted in a center longitudinal cavity formed in said plug means from the head end thereof, one end of which coil spring rests on the bottom of said plug means longitudinal cavity and the other coil spring end rests against cylindrical pin longitudinal cavity biasing said plug means in an extended attitude.

8. A trailer hitch as recited in claim 7, wherein the locking rod central section is arranged to travel over the coil spring end mounting across the cylindrical pin longitudinal cavity and includes a surface alongside the notched out portion that is to engage when said locking rod is turned appropriately, the head of the plug means to urge said plug means along the cylindrical pin longitudinal cavity, into an extended attitude.

9. A trailer hitch as recited in claim 8, further including means for biasing the locking rod turning to an attitude where the plug means is maintained in an extended attitude.

10. A trailer hitch as recited in claim 9, wherein the means for biasing the locking rod is a flat spiral spring, one end of which is secured across a locking rod end and the other end is secured to the cylindrical pin.

11. A trailer hitch as recited in claim 8, further including a set screw means having an for fitting in the cylindrical pin, said set screw means having an end to engage at least one slot or depression formed in the locking rod for verifying locking rod positioning.

12. A trailer hitch as recited in claim 1, wherein the means for extending the plug means is a camming rod that is fitted through a lateral hole through said plug means, proximate to a top end thereof, which said camming rod is journaled laterally through the cylindrical pin and includes an eccentric that is positioned within said plug means lateral hole, the outer surface of said eccentric to travel along the wall of said plug means lateral hole to move said plug means between its extended and retracted positions.

13. A trailer hitch as recited in claim 12, further including means for biasing the camming rod to where the plug means is in an extended attitude.

14. A trailer hitch as recited in claim 13, wherein the means for biasing the camming rod is a flat spiral spring, one end of which is secured across a camming rod end and the other end is secured to the cylindrical pin.

15. A trailer hitch as recited in claim 12, further including a set screw means having an end for fitting in the cylindrical pin, said set screw means end to engage at least one slot or depression formed in the camming rod for verifying camming rod positioning.

16. A trailer hitch as recited in claim 1, wherein the pivot means is a universal joint one side or face of which is secured across the end of the trailer towbar and the other end or face of which is secured across the top end of the pin means.

17. A trailer hitch as recited in claim 1, wherein the pivot means is a channel section, a web thereof for coupling across an end of the trailer towbar, and sides of which channel section are positioned parallel to a pitch axis of the trailer towbar end; which channel sides have aligned center pins therethrough; and a second plate having aligned parallel upstanding brackets that extend from opposite sides thereof that have aligned holes formed therethrough, said second plate for mounting across said pin means upper end, which said upstanding brackets are parallel to the pitch axis across said pin means upper end, and said pin ends are fitted through said bracket holes.

* * * * *